United States Patent
Higashiura et al.

[11] Patent Number: 5,816,610
[45] Date of Patent: Oct. 6, 1998

[54] SEAT STRUCTURE HAVING A SIDE IMPACT AIR BAG APPARATUS

[75] Inventors: Takuya Higashiura; Haruhiko Tsutsumi, both of Aichi-ken, Japan

[73] Assignee: Toyota Jidosha Kabushiki Kaisha, Toyota, Japan

[21] Appl. No.: 714,431

[22] Filed: Sep. 16, 1996

[30] Foreign Application Priority Data

Oct. 11, 1995 [JP] Japan ..................................... 7-262883
Mar. 7, 1996 [JP] Japan ..................................... 8-050151

[51] Int. Cl.⁶ ............................ B60R 21/20; B60R 21/22
[52] U.S. Cl. ..................................... 280/728.3; 280/730.2; 297/216.13
[58] Field of Search ........................ 280/730.2, 730.1, 280/728.3, 728.2, 728.1; 297/216.13, 216.12

[56] References Cited

U.S. PATENT DOCUMENTS

| | | | |
|---|---|---|---|
| 5,112,079 | 5/1992 | Haland et al. | 280/730.2 |
| 5,222,761 | 6/1993 | Kaji et al. | 280/730.2 |
| 5,251,931 | 10/1993 | Semchena et al. | 280/730.1 |
| 5,348,342 | 9/1994 | Haland et al. | 280/730.2 |
| 5,492,361 | 2/1996 | Kim | 280/730.1 |
| 5,498,030 | 3/1996 | Hill et al. | 280/728.2 |
| 5,503,428 | 4/1996 | Awotwi et al. | 280/730.2 |
| 5,533,750 | 7/1996 | Karlow et al. | 280/728.2 |
| 5,540,460 | 7/1996 | Wipasuramonton | 280/730.1 |
| 5,547,214 | 8/1996 | Zimmerman, II et al. | 280/730.1 |
| 5,553,887 | 9/1996 | Karlow et al. | 280/728.3 |
| 5,564,739 | 10/1996 | Davidson | 280/730.2 |
| 5,601,332 | 2/1997 | Schultz et al. | 280/730.2 |

FOREIGN PATENT DOCUMENTS

| | | |
|---|---|---|
| 1 800 621 | 4/1969 | Germany . |
| 40 08 243 | 9/1991 | Germany . |
| 50-8633 | 5/1973 | Japan . |
| 3-281455 | 12/1991 | Japan . |
| 4-356246 | 12/1992 | Japan . |
| 7-215159 | 8/1995 | Japan . |
| 1 199 837 | 7/1970 | United Kingdom . |
| 2 281 259 | 3/1995 | United Kingdom . |
| WO 96/07563 | 3/1996 | WIPO . |

OTHER PUBLICATIONS

Patent Abstracts of Japan, 07/215159, Aug. 1995, Muramoto et al.,.
Patent Abstracts of Japan, 08/216820, Aug. 1996, Yamamoto,.

*Primary Examiner*—Peter C. English
*Attorney, Agent, or Firm*—Cushman Darby & Cushman IP Group of Pillsbury Madison & Sutro LLP

[57] ABSTRACT

A seat structure having an side impact air bag apparatus which can reduce costs, and can be assembled with improved workability. The air bag apparatus, which extends in the longitudinal direction of a seat back, is disposed in a side portion provided on the outer side of the seat back in the widthwise direction of the vehicle. An air bag of the air bag apparatus is folded and the folded air bag is integrated with a seat back pad during a foaming process, and is fixed to a seat back frame together with other structural components of the air bag apparatus. When the seat back pad is made by foaming, the air bag in the folded state is placed within a molding die, and a foaming material is foamed to obtain the seat back pad integrated with the air bag.

9 Claims, 10 Drawing Sheets

SEAT STRUCTURE HAVING A SIDE IMPACT AIR BAG APPARATUS

BACKGROUND OF THE INVENTION

1. Field of the Invention:

The present invention relates to a seat structure having an air bag apparatus for countering a side impact (hereinafter referred to as a "side impact air bag apparatus"), and more particularly to a seat structure which has a side impact air bag apparatus at a side portion of a seat back facing a door.

2. Description of the Related Art:

A seat structure having a side impact air bag apparatus has been conventionally known, and an example of such a seat structure is disclosed in Japanese Patent Application Laid-Open (JP-A) No. 4-356246.

As shown in FIG. 10, in the seat structure disclosed in the patent publication, an air bag 94 of an air bag apparatus 92 is provided at a side of a seat back 90 such that the air bag 94 deploys toward the front of the vehicle between an unillustrated door and an occupant. Since the opening of an air bag lid 96 is restricted by unillustrated guide means, it is possible to force the air bag 94 to deploy toward the occupant.

In the conventional seat structure having a side impact air bag apparatus, since the air bag lid 96 forms a part of a side design surface 90A of the seat back 90, the air bag lid 96 must have a shape that conforms to the design surface 90A. Therefore, the air bag apparatus 92 including the air bag lid 96 must be custom designed for each vehicle model, resulting in considerably increased cost. In order to solve this problem, the air bag apparatus 92 including the air bag lid 96 may be designed to be commonly usable among various vehicle models, and a seat-shape-forming urethane or the like may be disposed on the outer side of the air bag lid 96. In this case, the urethane or the like may be manufactured for each vehicle model to have a shape corresponding to the side design surface 90A of the seat back 90. However, in this case, assembly workability becomes degraded.

SUMMARY OF THE INVENTION

The present invention has been accomplished in view of the above-mentioned problems, and an object of the present invention is to provide a seat structure having a side impact air bag apparatus which can reduce costs, and can be assembled with improved workability.

According to a first aspect of the present invention, there is provided a seat structure having a side impact air bag apparatus, in which a side impact air bag is integrated with a seat back pad, and is fixed to a seat back frame together with other structural components of the air bag apparatus.

Therefore, it becomes unnecessary to provide a case for the air bag.

According to a second aspect of the present invention, in the seat structure having a side impact air bag apparatus according to the first aspect, the air bag is disposed such that the outer face of the air bag is flush with the design surface of the seat back.

Therefore, in its folded state, the air bag does not extend far from the design surface of the seat back.

According to a third aspect of the present invention, in the seat structure having a side impact air bag apparatus according to the first aspect, the air bag is disposed within the seat back pad such that a design surface is formed by part of the seat back pad located on the outer side of the air bag.

Therefore, the design surfaces of various kinds of seats can be formed by the pad on the outer side of the air bag.

According to a fourth aspect of the present invention, in the seat structure having a side impact air bag apparatus according to the first aspect, means for preventing permeation of a foaming material is applied to an end surface of the folded air bag which extends in the longitudinal direction of a seat back.

Therefore, a foaming material is prevented by the permeation preventing means from permeating into the end surface of the folded air bag.

According to a fifth aspect of the present invention, in the seat structure having a side impact air bag apparatus according to the fourth aspect, the means for preventing permeation of a foaming material is applied to the outer peripheral surface of the air bag excepting the upper and lower end surfaces thereof in the folded state.

Therefore, the air bag can stably be maintained folded by the foaming material permeated into the air bag through the upper and lower end surfaces thereof.

According to a sixth aspect of the present invention, in the seat structure having a side impact air bag apparatus according to the first aspect, the air bag is maintained folded by restricting means which can easily be broken.

Therefore, the air bag is maintained in a folded state by the restricting means.

According to a seventh aspect of the present invention, there is provided a seat structure having a side impact air bag apparatus, in which the side impact air bag apparatus is integrated with a seat back pad to be embedded therein and is fixed to a seat back frame. Therefore, even when the air bag apparatus is commonly used among several vehicle models having different seat designs, no seat-shape-forming urethane is required.

According to an eighth aspect of the present invention, there is provided a seat structure having a side impact air bag apparatus, which includes a seat pad body made through foaming together with a lining member disposed at the back surface of the seat pad body so that the lining member is simultaneously impregnated by foaming, said lining member having a perforation at a portion from which deployment of the air bag starts, a seat back frame to which the side impact air bag apparatus is fixed on a window side thereof and which is covered by the seat pad body, a seat-side structure with which a side portion end of the lining member is engaged, and a seat surface layer for covering the seat pad body.

Therefore, the lining member provided at the back of the seat pad body protects the air bag in the folded state and guides the air bag to a predetermined deployment direction when the air bag deploys.

According to a ninth aspect of the present invention, in the seat structure having a side impact air bag apparatus according to the eighth aspect, the lining member is made of nonwoven fabric cloth, felt, or a like material.

Since the lining member has conventionally been used to prevent the seat pad body from being ruptured by a seat spring or the like, the seat structure of the present aspect can easily be manufactured using a conventional method of manufacture.

According to a tenth aspect of the present invention, in the seat structure having a side impact air bag apparatus according to the eighth aspect, the side portion end of the lining member is extended further than is the side portion end of the seat pad body, and is engaged with the seat-side structure through use of an engagement member.

Since the assembly can be carried out by engaging the engagement member, which is attached to the side portion end of the lining member, with the seat-side structure, the assembly can be performed with improved workability.

According to an eleventh aspect of the present invention, in the seat structure having a side impact air bag apparatus according to the eighth aspect, an air bag protecting member is interposed between the air bag and the seat back frame and is fixed to the seat-side structure.

Therefore, the air bag protecting member prevents the air bag from being damaged by burrs of the seat back frame. Further, the air bag protecting member remains on the seat side when the air bag deploys.

The above and other objects, features and advantages of the present invention will become apparent from the following description and the appended claims, taken in conjunction with the accompanying drawings in which preferred embodiments of the, present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS

A first embodiment of the present invention will be described with reference to FIGS. 1 and 2.

Figure 1:
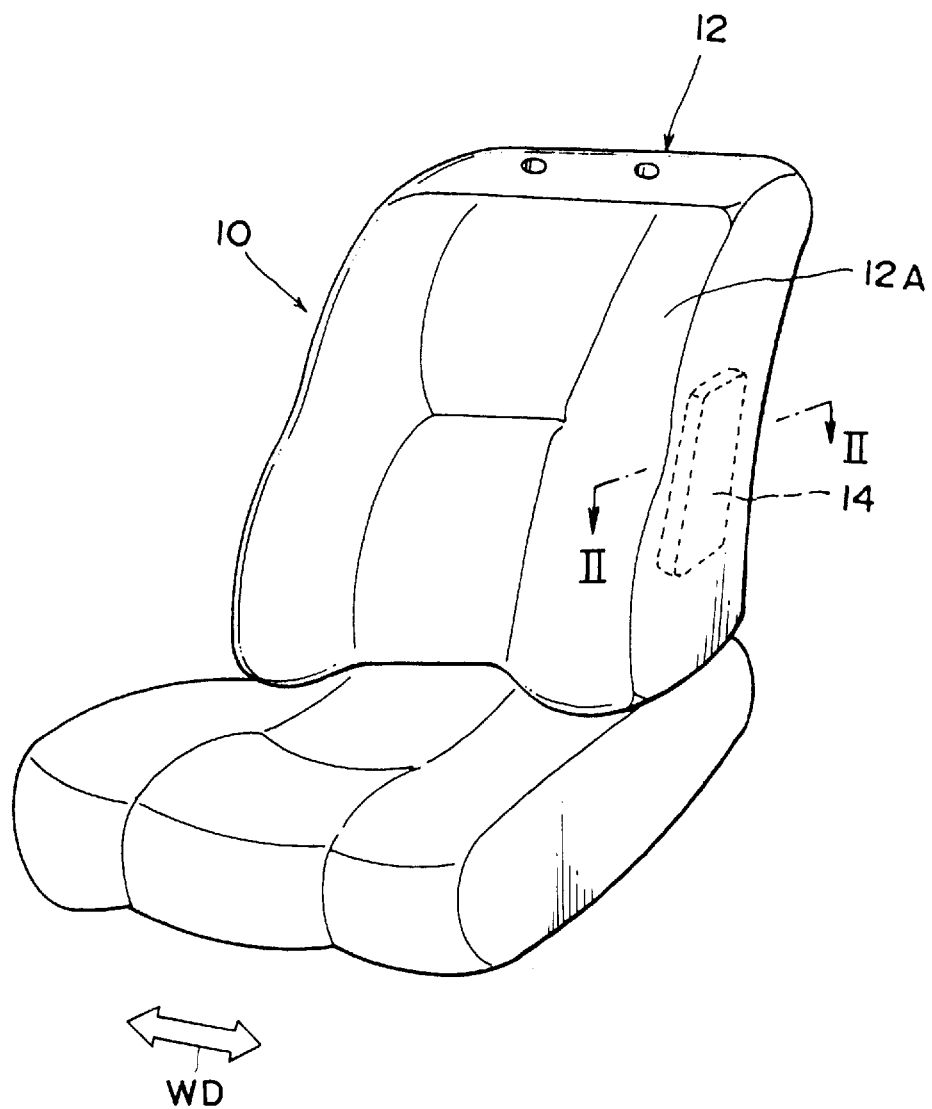
FIG. 1 is a perspective view of a seat, as viewed from the front side of the seat at an angle, to which a seat structure having a side impact air bag apparatus according to a first embodiment of the present invention is applied.

As shown in FIG. 1, in a seat structure having a side impact air bag apparatus according to the first embodiment, a side impact air bag apparatus 14 is disposed within a seat back 12 of a seat 10. More specifically, the air bag apparatus 14 is disposed within a side portion 12A formed on the outer side of the seat back 12 in the widthwise direction of the vehicle (in the direction of arrow WD) such that the air bag apparatus 14 extends in the longitudinal direction of a seat back 12 (i.e., in the vertical direction).

Figure 2:
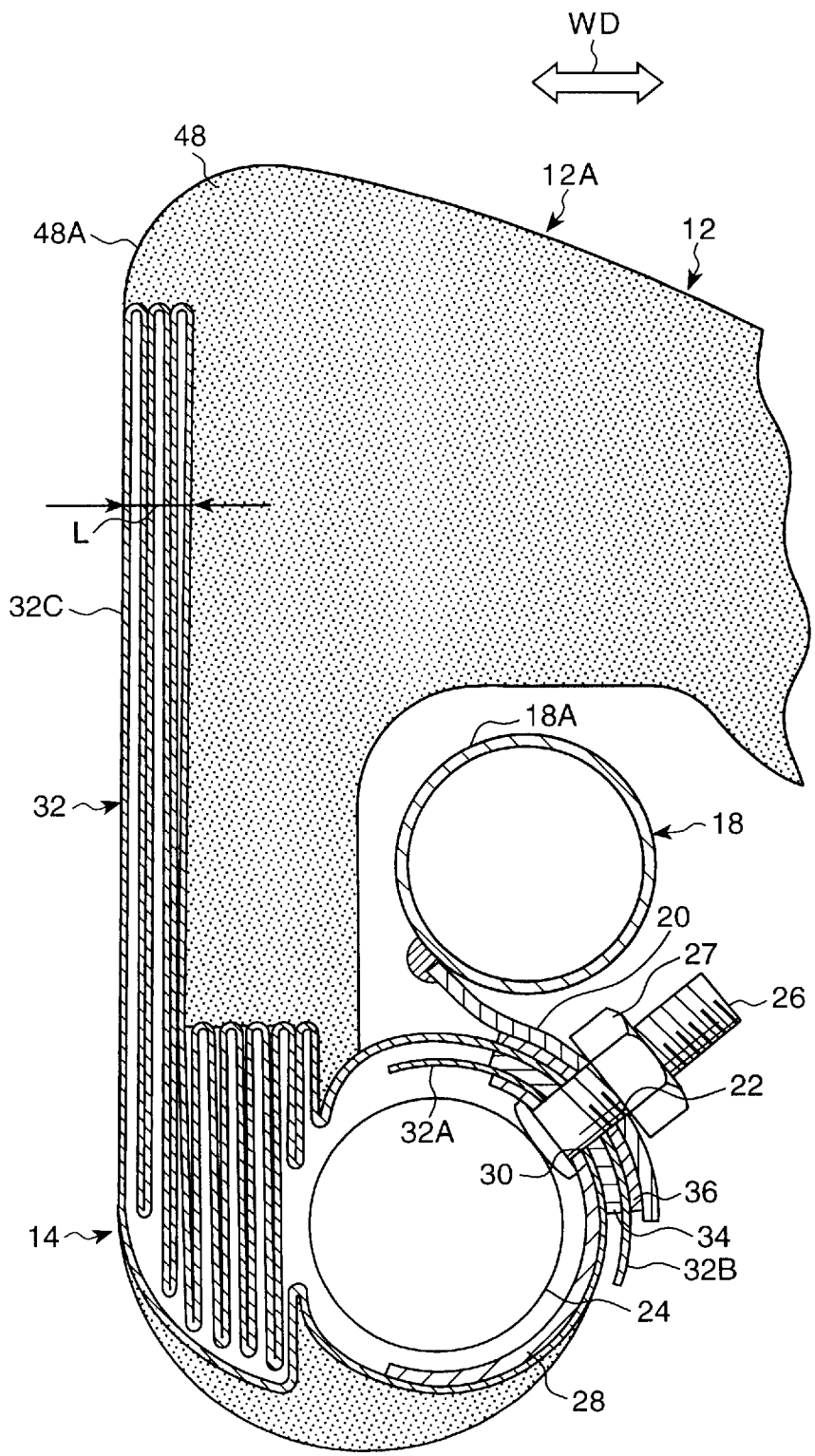
FIG. 2 is an enlarged sectional view taken along the line II—II in FIG. 1.

As shown in FIG. 2, within the side portion 12A of the seat back 12, a tube-shaped side frame 18, which forms part of a seat back frame, is disposed along the longitudinal direction of the seat back 12. A seat bracket 20 is welded to the peripheral surface 18A of the side frame 18. In the seat bracket 20 are formed two through-holes 22 with a predetermined spacing therebetween along the longitudinal direction of the seat back 12 for attachment of the air bag apparatus 14.

Stud bolts 26 are inserted into the through-holes 22 from the outer back side of the seat back 12 in the widthwise direction (in the direction of arrow WD). The stud bolts 26 are caulked around through-holes 30 formed in a diffusing plate 28 of the air bag apparatus 14, in the outer peripheral surface of the diffusing plate 28. Although not illustrated in the drawings, the diffusing plate 28 has a tubular shape at its central portion in the longitudinal direction (vertical direction). The tubular portion of the diffusing plate 28 is caulked around and fixed to the outer peripheral surface of a cylindrical gas inflator 24 which is disposed along the longitudinal direction of the seat back 12. The diffusing plate 28 has a substantially semicircular cross section at positions excepting the central portion thereof.

Accordingly, when gas is jetted outward from the outer circumferential surface of the gas inflator 24 in the radial direction, part of the gas jetted toward the interior of the seat back 12 is forced by the diffusing plate 28 to flow toward the outer side of the seat back 12, i.e., toward the air bag 32.

Between the diffusing plate 28 and the seat bracket 20 are held the opening edge portions 32A and 32B of the air bag 32. A reinforcing cloth 34 is interposed between the opening edge portions 32A and 32B, and a reinforcing cloth 36 is interposed between the opening edge portion 32B and the seat bracket 20. The reinforcing cloth 34 is sewed to the outer face of the opening edge portion 32A, while the reinforcing cloth 36 is sewed to the outer face of the opening edge portion 32B. With this structure, the opening edge portions 32A and 32B of the air bag 32 are sealed, so that gas is prevented from leaking through the sealed portion.

The opening edge portions 32A and 32B of the air bag 32 and the reinforcing clothes 34 and 36 respectively have through holes through which the stud bolts 26 pass.

The air bag 32 is folded, and the outermost face 32C of the folded air bag 32 forms a part of a design surface 48A of a seat back side-portion of a seat back pad 48.

In the seat structure having a side impact air bag apparatus according to the first embodiment, the air bag 32 in a folded and compressed state is placed in a molding die, and a foaming material is then foamed in the molding die so as to obtain the seat back pad 48. Subsequently, the opening edge portions 32A and 32B of the air bag 32 are separated from each other to open the air bag 32, and the gas inflator 24 and the diffusing plate 28 previously integrated together are inserted into the opening of the air bag 32. Subsequently, the opening edge portion 32A of the air bag 32, the reinforcing cloth 34, the opening edge portion 32B of the air bag 32, and the reinforcing cloth 36 are superposed in this order on the diffusing plate 28, such that the two stud bolts 26 pass through their through-holes. The stud bolts 26 are then passed through the through-holes 22 of the seat bracket 20, and nuts 27 are screwed onto the stud bolts 26 so as to fix the gas inflator 24 and the air bag 32 to the seat bracket 20.

Next, the operation of the air bag apparatus 14 in the first embodiment will be described.

When the gas inflator 24 of the air bag apparatus 14 is operated upon occurrence of a side crash, gas is Jetted from the gas inflator 24. Gas is Jetted outward from the outer circumferential surface of the gas inflator 24 in the radial direction. At this time, the portion of the gas Jetted toward the interior of the seat back 12 is forced by the diffusing plate 28 to flow toward the air bag 32. Accordingly, the gas is effectively fed into the air bag 32, so that the air bag 32 deploys and expands instantaneously. Due to the force produced by the deployment and expansion of the air bag 32, the air bag 32 separates from the seat back pad 48 and completely expands so as to be situated on a side of a vehicle occupant.

As described above, in the seat structure having a side impact air bag apparatus according to the first embodiment, when the seat back pad 48 is made through foaming, the air bag 32, which has been folded and compressed, is placed in a molding die, and a foaming material is then foamed in the molding die so as to obtain the seat back pad 48 with which the air bag 32 is integrated. Therefore, an air bag case having an air bag cover can be omitted. This greatly decreases costs and improves the assembly workability.

In the seat structure having a side impact air bag apparatus according to the first embodiment, the outermost face 32C of the folded air bag 32 forms a part of the design surface 48A of the seat back side-portion of the seat back pad 48. Accordingly, the depth L of the space occupied by the folded air bag 32 from the seat back design surface 48A can be reduced.

Next, a seat structure having a side impact air bag apparatus according to a second embodiment of the present invention will be described with reference to FIG. 3.

The members identical to those of the first embodiment are denoted by the same reference numerals, and their descriptions will be omitted.

Figure 3:
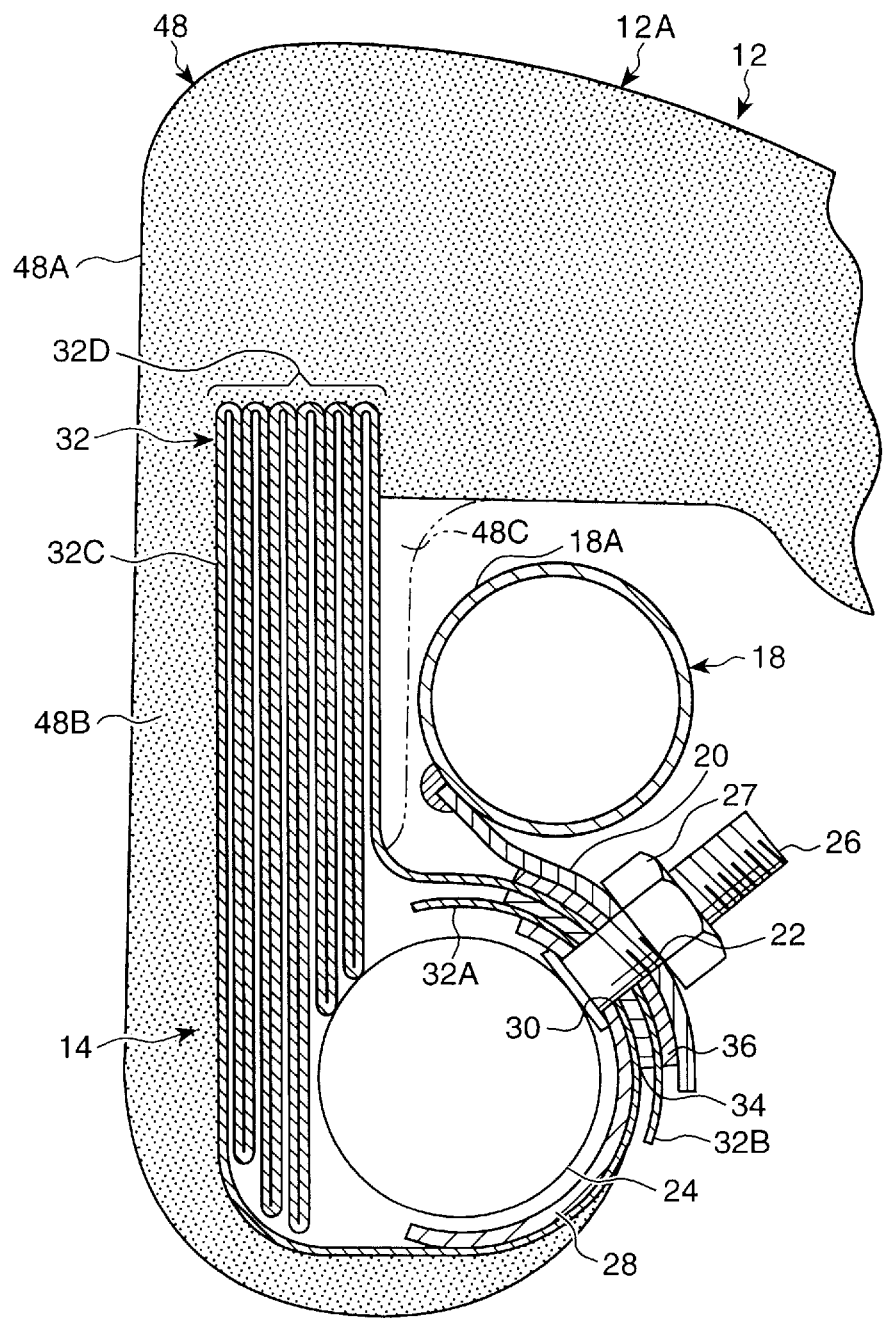
FIG. 3 is a sectional view, corresponding to the sectional view of FIG. 2, which shows a seat structure having a side impact air bag apparatus according to a second embodiment of the present invention.

As shown in FIG. 3, in the seat structure having a side impact air bag apparatus according to the second embodiment, the air bag 32 is disposed inside the seat back pad 48 in a folded state, and the outermost face 32C of the air bag 32 is covered by the side portion 48B of the seat back pad 48. So, the side portion 48B forms a design surface. Accordingly, the air bag 32 deploys while rupturing the side portion 48B of the seat back pad 48.

Although the air bag 32 is fixed to the seat back pad 48 through permeation of the foaming material into the air bag 32, such fixation to the seat back pad 48 at some portions of the air bag 32 hinders deployment of the air bag 32 if such fixation is performed to an excessive degree.

Therefore, when the seat back pad 48 is made by foaming, a mold release agent serving as means for preventing permeation of a foaming material is applied to portions of the air bag 32 which would hinder deployment of the air bag. In this embodiment, a mold release agent is 13 applied to the front-side end surface portion 32D which extends in the longitudinal direction of the seat back 12 and which is situated in a region toward which the air bag 32 deploys.

However, the mold release agent is not applied to the opposite longitudinal end surface portions of the folded air bag 32, i.e., the upper and lower end surface portions, which are continued to the upper and lower ends of the front-side end surface portion 32D. Since the foaming material permeates into the opposite longitudinal end surface portions, the air bag 32 can be held in a folded state.

Next, the operation of the air bag apparatus 14 in the second embodiment will be described.

When the gas inflator 24 of the air bag apparatus 14 is operated upon occurrence of a side crash, gas is jetted from the gas inflator 24. Gas is jetted outward from the outer circumferential surface of the gas inflator 24 in the radial directions At this time, the portion of the gas jetted toward the interior of the seat back 12 is forced by the diffusing plate 28 to flow toward the air bag 32. Accordingly, the gas is effectively fed into the air bag 32, so that the air bag 32 deploys and expands instantaneously. Due to the force produced by the deployment and expansion of the air bag 32, the air bag 32 ruptures the side portion 48B of the seat back pad 48 while separating from the seat back pad 48, so that the air bag 32 completely expands so as to be situated on a side of a vehicle occupant.

As described above, in the seat structure having a side impact air bag apparatus according to the second embodiment, when the seat back pad 48 is made through foaming, the air bag 32, which has been folded and compressed, is placed in a molding die, and a foaming material is then foamed in the molding die so as to obtain the seat back pad 48 with which the air bag 32 is integrated. Therefore, an air bag case having an air bag cover can be omitted. This greatly decreases costs and improves the assembly workability.

In the seat structure having a side impact air bag apparatus according to the second embodiment, the folded air bag 32 is disposed inside the seat back pad 48, and outermost face 32C of the folded air bag 32 is covered by the side portion 48B of the seat back pad 48, which forms a design surface. Accordingly, the design surfaces of various kinds of seats can be obtained by changing the shape of the side portion 48B of the seat back pad 48.

Further, since the mold release agent is applied to at least the front-side end surface portion 32D of the air bag 32, it is possible to prevent the foaming material from permeating into the front-side end surface portion 32D, which is considered to hinder deployment of the air bag 32 if it is fixed to the seat back pad 48 to an excessive degree due to permeation of the foaming material.

Since the mold release agent is not applied to the opposite longitudinal end surface portions of the folded air bag 32, i.e., the upper and lower end surface portions, which are continued to the upper and lower ends of the front-side end surface portion 32D, the foaming material permeates into the opposite longitudinal end surface portions, so that the air bag 32 can be held in a folded state.

In the above-described seat structure, the air bag 32 is stably held in a folded state by allowing the foaming material to permeate into the opposite longitudinal end portions of the folded air bag 32. Alternatively, the air bag 32 may be stably held in the folded state by using an easily breakable restricting means such as thread or a belt, which prevents the air bag 32 from unfolding.

Moreover, as shown by an imaginary line in FIG. 3, the seat back pad 48 may have an extended portion 48C located between the folded air bag 32 and the side frame 18. In this case, the extended portion 48C prevents the air bag 32 from interfering with the side frame 18 and from uselessly expanding toward the side frame 18.

Next, a seat structure having a side impact air bag apparatus according to a third embodiment will be described with reference to FIG. 4.

The members identical to those of the first and second embodiments are denoted by the same reference numerals, and their descriptions will be omitted.

Figure 4:
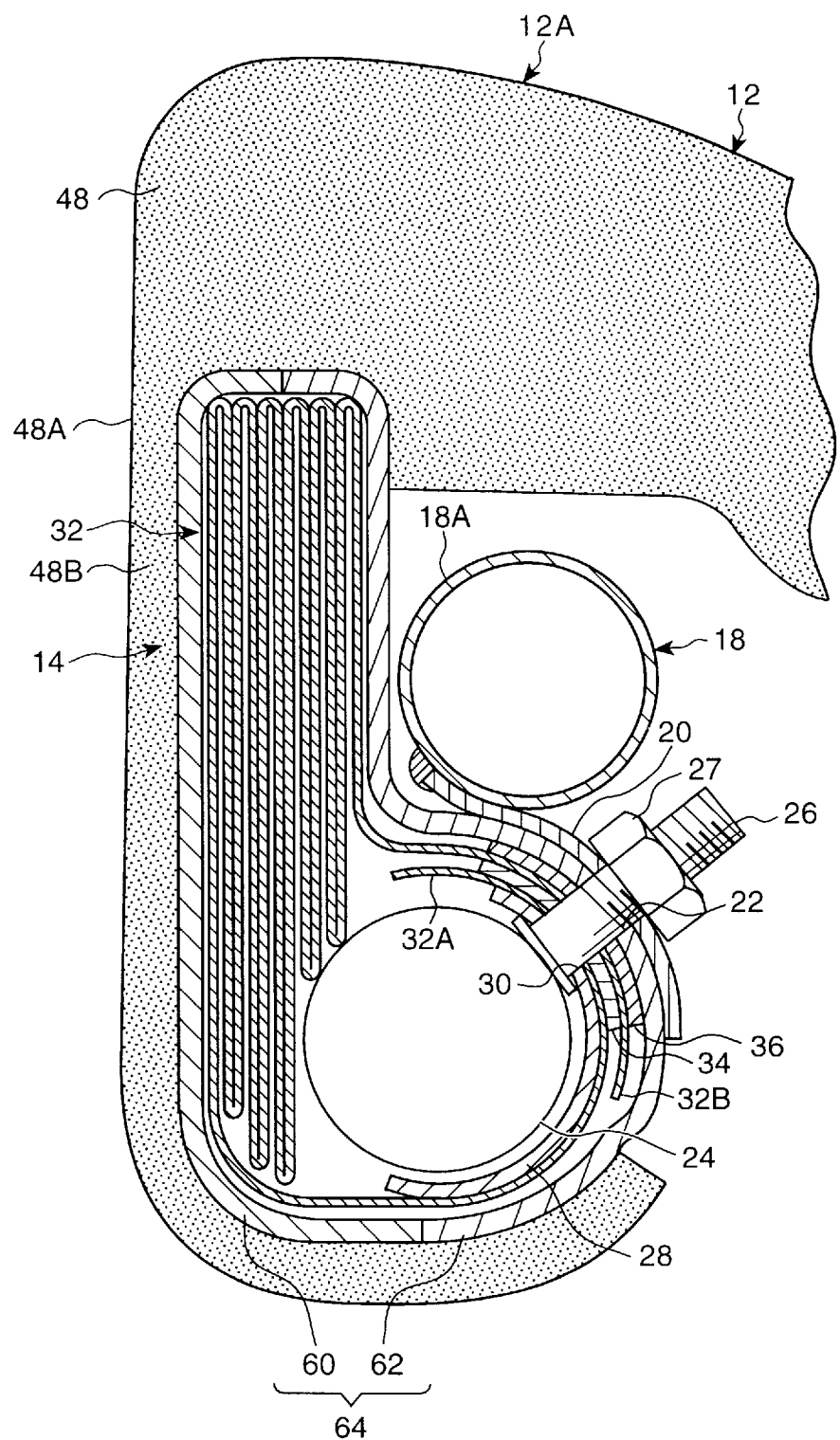
FIG. 4 is a sectional view, corresponding to the sectional view of FIG. 2, which shows a seat structure having a side impact air bag apparatus according to a third embodiment of the present invention.

As shown in FIG. 4, in the seat structure having a side impact air bag apparatus according to the third embodiment, the air bag apparatus 14 is provided with an air bag case 64 composed of a lid 60 which opens upon deployment of the air bag 32, and a base 62 fixed to the side frame 18 via the seat bracket 20. The air bag apparatus 14 is integrated with the seat back pad 48 to be located inside the seat back pad 48, and the outer side portion of the lid 60 is covered by the side portion 48B of the seat back pad 48.

Next, the operation of the air bag apparatus 14 in the third embodiment will be described.

When the gas inflator 24 of the air bag apparatus 14 is operated upon occurrence of a side crash, gas is jetted from the gas inflator 24. At this time, gas is Jetted outward from the outer circumferential surface of the gas inflator 24 in the radial direction. The portion of the gas jetted toward the interior of the seat back 12 is forced by the diffusing plate 28 to flow toward the air bag 32. Accordingly, the gas is effectively fed into the air bag 32, so that the air bag 32 deploys and expands instantaneously. Due to the force produced by the deployment and expansion of the air bag 32, the lid 60 ruptures and opens the side portion 48B of the seat back pad 48, that the air bag 32 completely expands so as to be situated on a side of a vehicle occupant.

As described above, in the seat structure having a side impact air bag apparatus according to the third embodiment, the lid 60 is covered by the side portion 48B of the seat back pad 48. Therefore, even when the air bag apparatus 14 is commonly used for seat backs 12 of several vehicle models having different seat designs, it becomes unnecessary to use a seat-shape-forming chip urethane which is provided on the outer side of the lid 60 so as to form the design surface 48A.

In the above-described first through third embodiments, the outer peripheral portion of the seat back 12 may be covered with a seat surface layer. Moreover, instead of the mold release agent, paper, plastic film, or a like material may be placed on a desired portion of the air bag 32 as the means for preventing permeation of a foaming material.

Next, a seat structure having a side impact air bag apparatus according to a fourth embodiment will be described with reference to FIGS. 5–9.

The members identical to those of the first embodiment are denoted by the same reference numerals, and their descriptions will be omitted.

Figure 5:
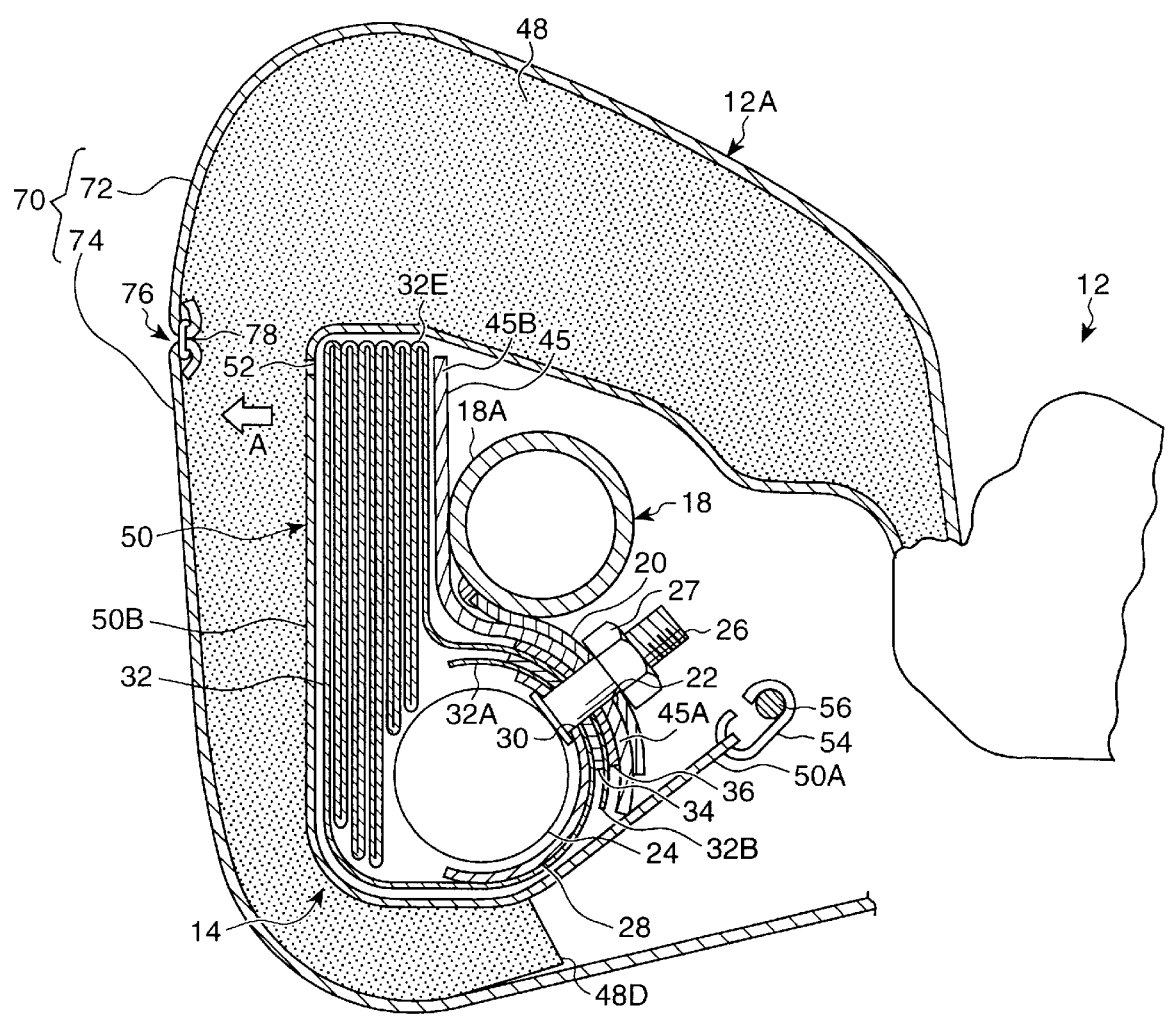
FIG. 5 is a horizontal sectional view showing a side portion of a seat structure having a side impact air bag apparatus according to a fourth embodiment of the present invention.

As shown in FIG. 5, a protector plate 45 is disposed between the folded air bag 32 and the side frame 18 so as to prevent the air bag 32 from been damaged by burrs produced due to welding between the side frame 18 and the bracket 20, and the like. The rear end portion 45A of the protector plate 45 is held between the bracket 20 and the reinforcing cloth 36, and the front end portion 45B thereof reaches a point close to the front end portion 32E of the folded air bag 32.

In the present embodiment, when the seat back pad 48 is made through foaming, a lining member 50 is fixed to the back, which may be referred to as inner, surface of the seat back pad 48, by taking advantage of permeation of a foaming material. The lining member 50 is formed of a nonwoven fabric cloth or a thin felt.

Figure 6:
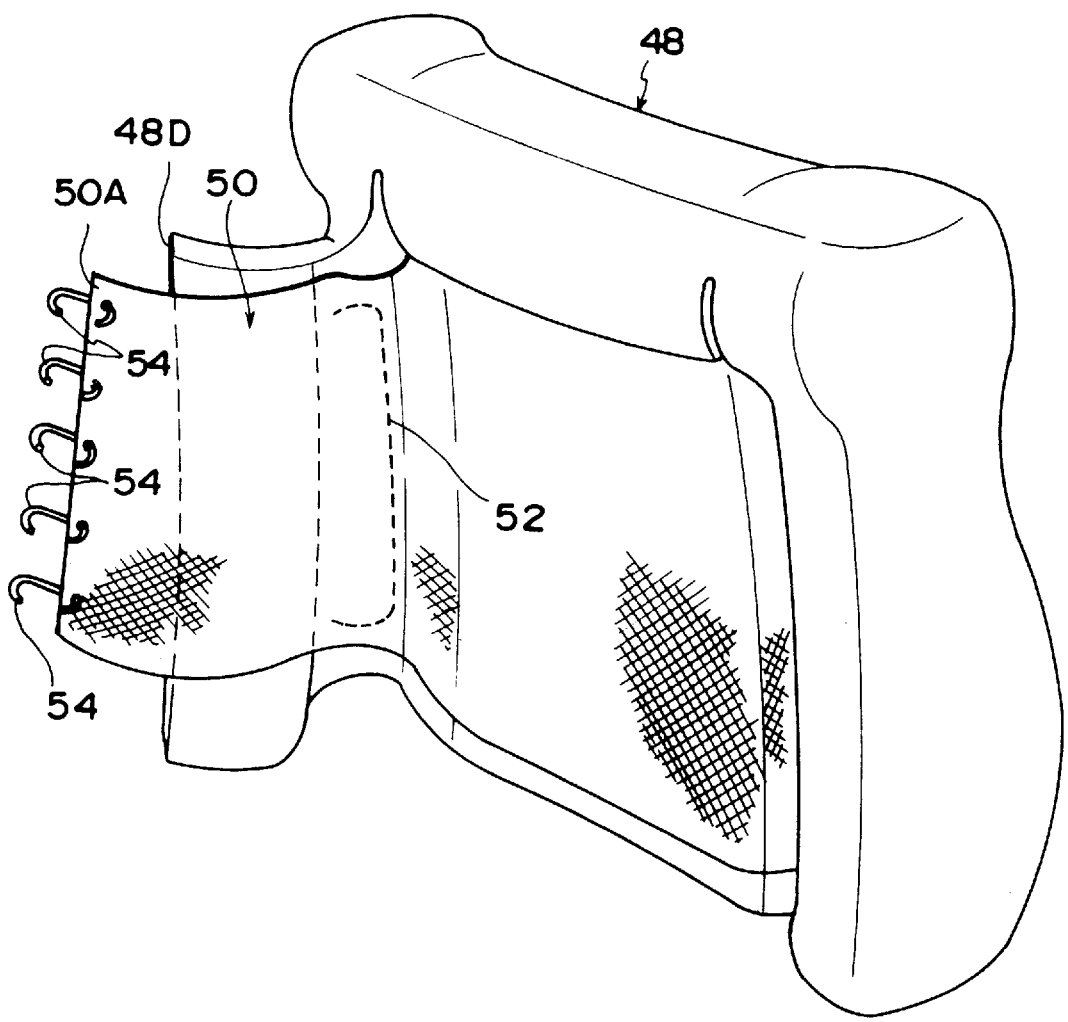
FIG. 6 is a perspective view showing the seat pad body of the seat structure shown in FIG. 5.

As shown in FIG. 6, the lining member 50 has perforations 52 at a portion at which deployment of the air bag 32 starts. The side portion end 50A of the lining member 50 is extended further than is the side portion end 48D of the seat pad 48. Further, C rings 54 each serving as an engagement member are attached to the side portion end SOA of the lining member 50 such that the C rings 54 are arranged at predetermined intervals in the vertical direction.

Figure 7:
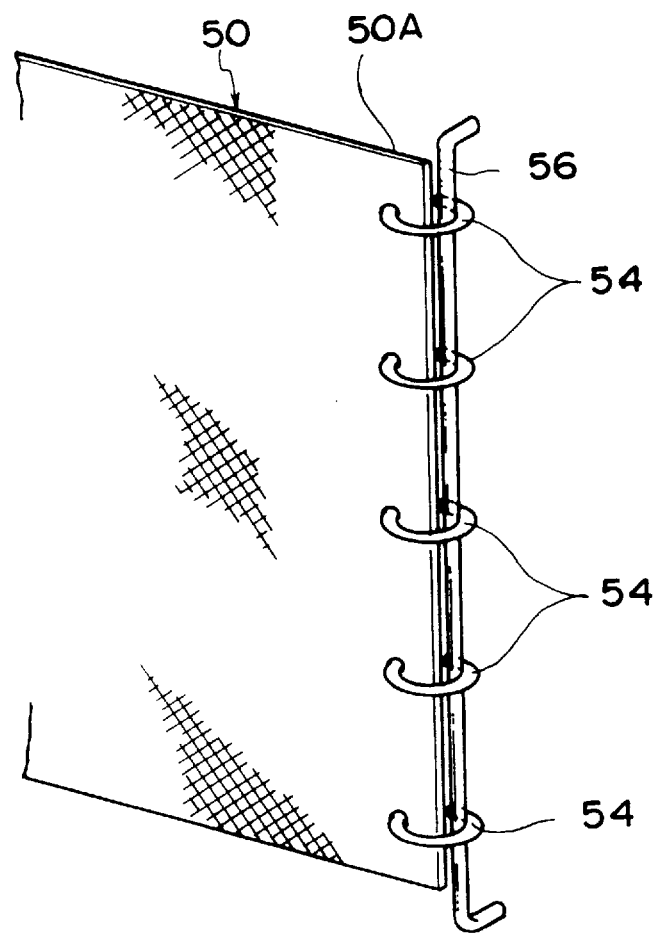
FIG. 7 is a perspective view showing the side portion end of the lining member of the seat structure shown in FIG. 5.

As shown in FIG. 7, the side portion end 50A of the lining member 50 is engaged via the hog rings 54 with a wire 56 serving as a seat-side structure. The upper and lower ends of the wire 56 are fixed to the seat back frame.

As shown in FIG. 5, the outer surface of the seat pad 48 is covered by a seat surface layer 70. A front seat surface layer 72 and a side seat surface layer 74 constituting the seat surface layer 70 are sewed together using a sewing thread 78 at a seam 76. The seam 76 is located at a position roughly facing the perforations 52 of the lining member 50. Therefore, the seat surface layer 70 instantaneously ruptures at the seam 76 when the air bag 32 deploys.

Next, the operation of the air bag apparatus 14 in the fourth embodiment will be described.

Figure 8:
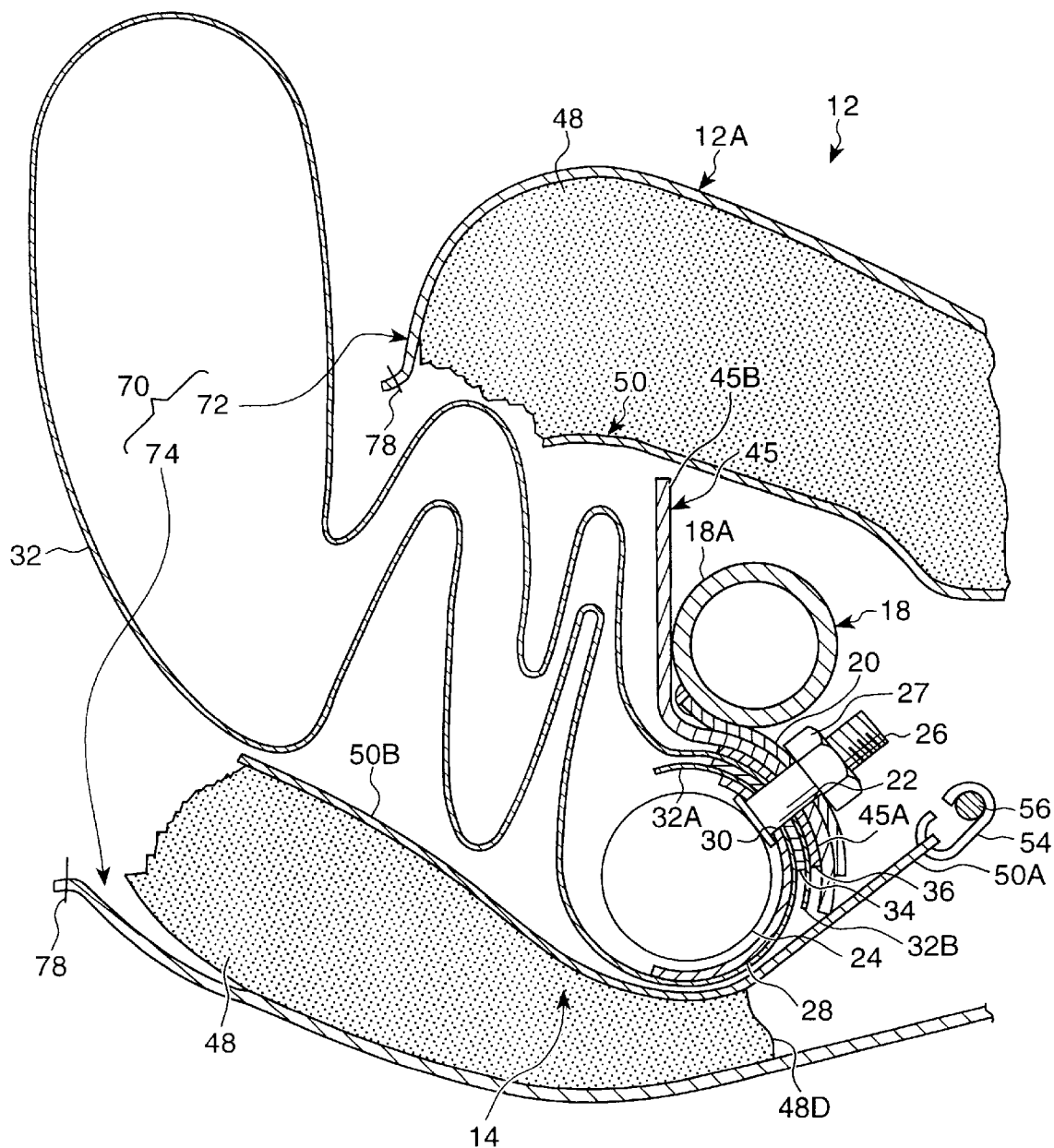
FIG. 8 is an explanatory illustration used for explaining the operation of the side impact air bag apparatus in the seat structure according to the fourth embodiment of the present invention.

When the gas inflator 24 of the air bag apparatus 14 is operated upon occurrence of a side crash, gas is Jetted from the gas inflator 24. At this time, gas is jetted outward from the outer circumferential surface of the gas inflator 24 in the radial directions. The portion of the gas Jetted toward the interior of the seat back 12 is forced by the diffusing plate 28 to flow toward the air bag 32. Accordingly, the gas is effectively fed into the air bag 32, so that the air bag 32 deploys and expands instantaneously. At this time, the air bag 32 presses the lining member 50 in the direction of arrow A in FIG. 5 so as to open the lining member 50. However, since the side portion end 50A of the lining member 50 located at the back of the air bag 32 is connected to the wire 56 via the C rings 54, the lining member 50 start rupturing from the perforations 52, as shown in FIG. 8. Further, the seat surface layer 70 ruptures at the seam 76, so that the seat pad 48 is broken, thereby allowing the air bag 32 to deploy. At this time, the portion 50B of the lining member 50 located behind the perforations 52 guides the air bag 32 so as to deploy it toward the front of the vehicle.

In the seat structure having a side impact air bag according to the present embodiment, as shown in FIG. 5, the lining member 50 protects the air bag 32 accommodated in the seat back in the folded state. Therefore, a conventionally used air bag case can be omitted, so that the cost can be decreased, along with the restriction on the appearance of the side portion 12A of the seat back 12.

Since nonwoven fabric cloth and felt used to form the lining member 50 are materials which have conventionally been used to prevent the seat back pad 48 from being ruptured by a seat spring or the like, the seat structure of the present aspect can easily be manufactured using a conventional method of manufacture.

Since the side portion end 50A of the lining member 50 is extended further than is the side portion end 48D of the seat pad 48 and the hog rings 54 are attached to the side portion end 50A, the assembly can be carried out by engaging the C rings 54, which are attached to the side portion end of the lining member 50, with the wire 56 fixed to the seat frame. Accordingly, the assembly can be performed with improved workability.

Since the protector plate 45 is interposed between the air bag 32 and the side frame 18, the protector plate 45 can prevent the air bag 32 from being damaged by burrs of the side frame or the like.

Figure 9:
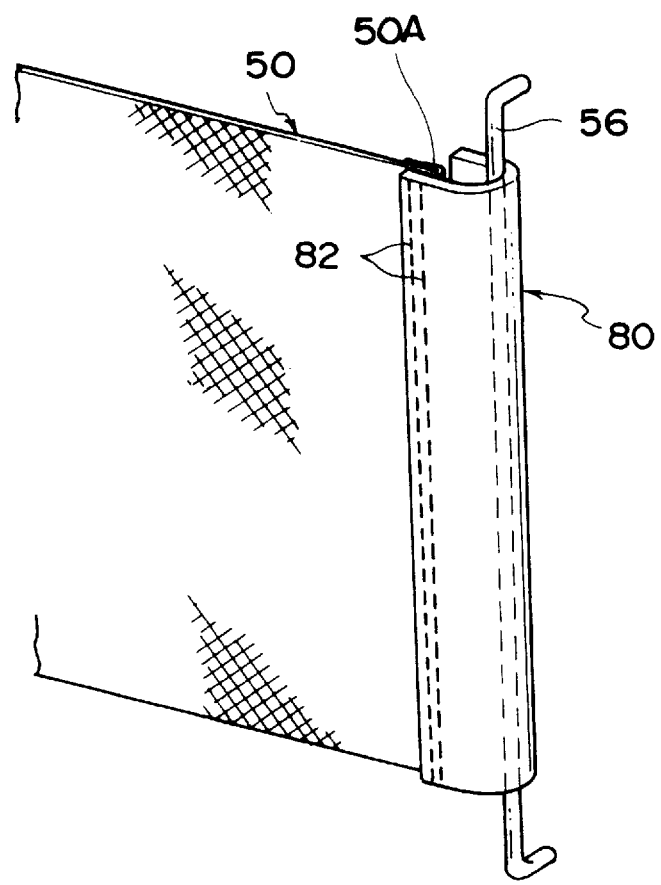
FIG. 9 is a perspective view showing a modification regarding the side portion end of the lining member of the seat structure shown in FIG. 5.
Figure 10:
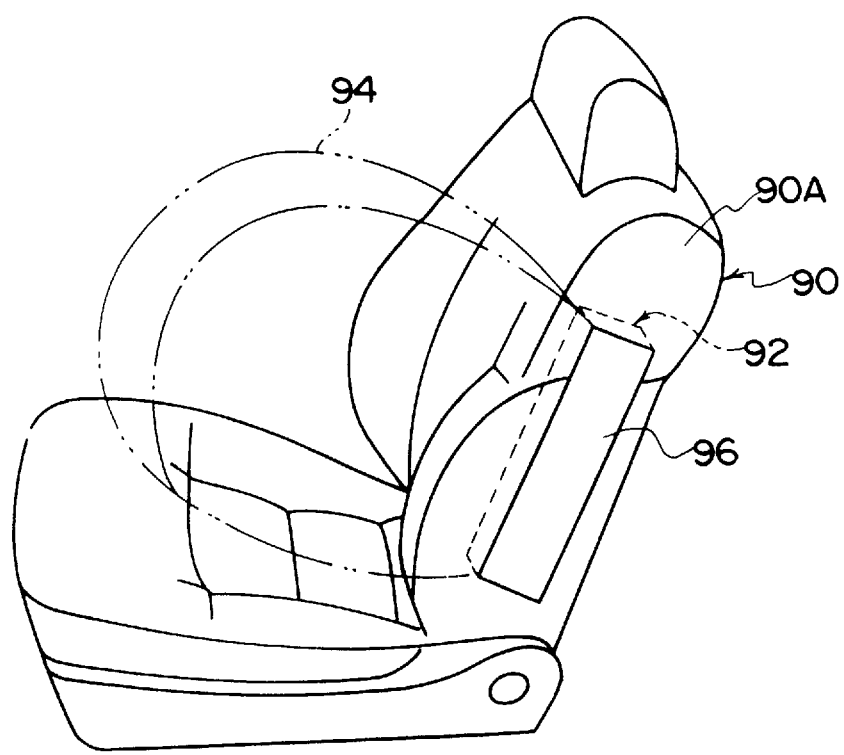
FIG. 10 is a schematic perspective view showing a conventional seat structure having a side impact air bag apparatus.

In the forth embodiment, the side portion end 50A of the lining member 50 is connected to the wire 56 via the c rings 54, as shown in FIG. 7. However, as shown in FIG. 9, the side portion end 50A of the lining member 50 may be connected to the wire 56 via a connector 80 serving as an engagement member which has a U-shaped cross section and extends in the vertical direction. In this case, the side portion end 50A of the lining member 50 may be sewed directly to the connector 80 using a sewing thread 82.

Moreover, instead of the wire 56, any other seat-side structure may be used as a portion with which the side portion end 50A of the lining member 50 is engaged. While the embodiments of the present invention, as herein disclosed, constitute a preferred form, it is to be understood that other forms might be adopted.

What is claimed is:

1. A seat structure comprising:

a side impact air bag apparatus having an air bag;

a seat back frame, the side impact air bag apparatus being fixed to a window-side side portion of said seat back frame;

a lining member disposed so as to overlie at least a portion of said air bag apparatus;

a seat pad body disposed so as to cover said seat back frame and the side impact air bag apparatus, the side impact air bag apparatus being provided proximate an inner surface of said seat pad body, said seat pad body being formed from a foaming material which penetrates into said lining member, whereby said lining member is fixed to said seat pad body, and at least one of said lining member and said seat pad body being provided with a rupturing portion from which deployment of the air bag of the side impact air bag apparatus starts, and said seat pad body is supported by said seat back frame via an engaging structure, a side portion of said lining member engaging said engaging structure; and a seat surface layer which covers an outer surface of said seat pad body.

2. A seat structure according to claim 1, wherein said lining member is formed from a material selected from the group consisting of nonwoven fabric cloth and felt.

3. A seat structure according to claim 1, wherein said engaging structure includes a seat-side structure and an engagement member, and wherein said side portion of said lining member extends beyond an end portion of said seat pad body.

4. A seat structure according to claim 3, wherein said engagement structure includes a plurality of C rings attached to the side portion of said lining member such that said C rings are disposed at predetermined intervals in a vertical direction.

5. A seat structure according to claim 3, wherein said engagement structure includes a connector which has a U-shaped cross section and extends in a vertical direction, and the side portion of said lining member is sewn to said connector with sewing thread.

6. A seat structure according to claim 1, wherein said engaging structure is a wire having upper and lower ends fixed to said seat back frame.

7. A seat structure according to claim 1, wherein an air bag protecting member is disposed between said air bag and said seat back frame.

8. A seat structure according to claim 1, wherein said rupturing portion includes a perforation defined in said lining member.

9. A seat structure according to claim 8, wherein said seat surface layer includes a front seat surface layer and a side seat surface layer which are sewn together with sewing thread at a seam located at a position generally facing the perforation of said lining member.

* * * * *

UNITED STATES PATENT AND TRADEMARK OFFICE
CERTIFICATE OF CORRECTION

PATENT NO. : 5,816,610

DATED : October 6, 1998

INVENTOR(S) : Haruhiko Tsutsumi

It is certified that error appears in the above-identified patent and that said Letters Patent is hereby corrected as shown below:

Title page, item [75], inventors: delete Takuya Higashiura.

Signed and Sealed this

First Day of December, 1998

BRUCE LEHMAN

*Attest:*

*Attesting Officer*  *Commissioner of Patents and Trademarks*